April 13, 1937.  G. G. SPRANG  2,077,280
MOUSE AND RAT TRAP BAIT CLAMP
Filed April 4, 1936
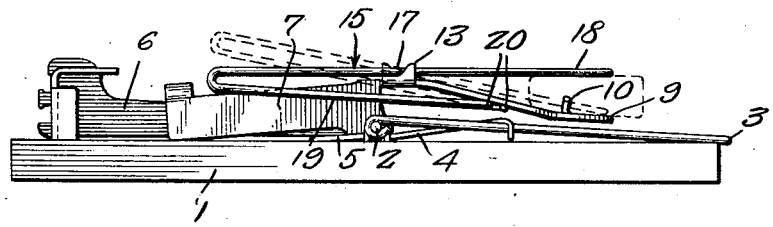
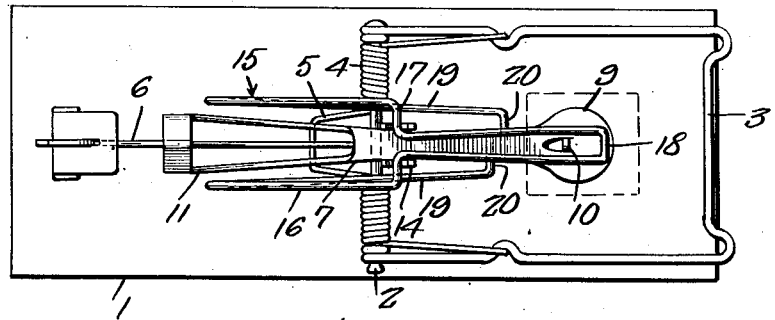
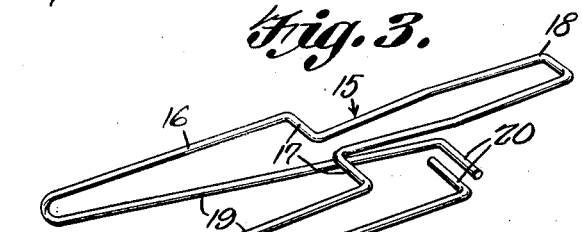
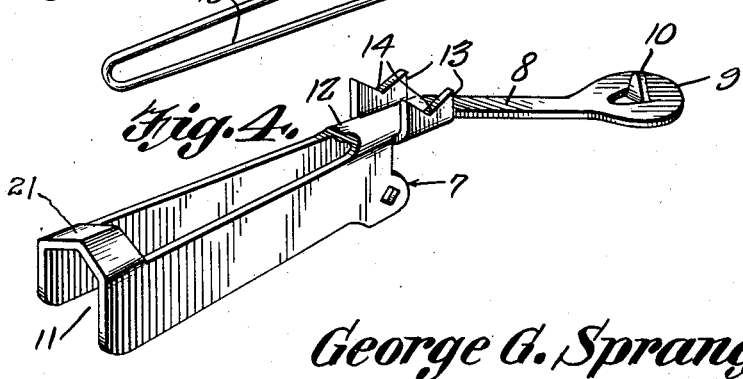
George G. Sprang,
INVENTOR Patented Apr. 13, 1937

2,077,280

UNITED STATES PATENT OFFICE 2,077,280

MOUSE AND RAT TRAP BAIT CLAMP

George G. Sprang, Shreve, Ohio

Application April 4, 1936, Serial No. 72,783

4 Claims. (Cl. 43—81)

My invention relates to improvements in rodent traps and more particularly to bait clamps for that type of rodent trap characterized by a fulcrumed bait supporting trigger arm.

In the above designated type of trap considerable difficulty is experienced in preventing the rodent from making off with the bait without springing the trap for the reason that the bait is insecurely held on the trigger arm.

With the foregoing in mind, the principal object of my invention is to provide a simple and effective means for holding the bait on the trigger arm so that it is impossible for the rodent to dislodge the same and whereby the springing of the trap is insured.

Another object is to equip a trap of this type with an improved form of trigger arm and bait clamp without adding materially to the cost of the trap or necessitating extensive modification in the trap as commonly constructed.

Still another object is to provide an inexpensive single piece clamp which is durable, strong and comparatively inexpensive to manufacture.

Other and subordinate objects together with the advantages of my improvements will be readily understood when the following description and claims are read with reference to the accompanying drawing.

In said drawing:

Figure 1 is a view in side elevation of the type of rodent trap designated and equipped with my invention, the trap being shown in sprung condition.

Figure 2 is a view in top plan.

Figure 3 is a view in perspective of my novel clamp.

Figure 4 is a view in perspective of my improved trigger arm.

Referring to the drawing by numeral, the type of rodent trap designated comprising a flat base 1 having fulcrumed thereon on a fixed pivot pin 2 the usual type of jaw frame 3 tensioned by the usual helical spring 4 having a central extension 5 bearing against the base 1. The numeral 6 designates the usual catch of the trap designed to cooperate with the trigger arm in a manner presently clear.

The trigger arm of my invention, as shown in Figure 4, comprises a lever 7 having a forward downwardly bent end 8 terminating in a bait supporting disk 9 having struck up therefrom a bait retaining lug 10. The trigger arm 7 is fulcrumed upon the pivot pin 2 and the other end thereof is bifurcated as at 11 to straddle the catch 6 and has a bridge portion 12 at one end designed to be engaged by said catch to set the trap as will be understood without further explanation. The opposite end of the trigger arm 7 is provided with a bridge portion 21 overlying the catch 6. Forwardly of the pivot pin 2 the trigger arm 7 is provided with a pair of laterally spaced upstanding lugs 13 having sockets 14 formed in their upper edges.

Detachably mounted on said trigger arm is a bait clamp including a frame 15 of resilient wire comprising a wide portion 16 adapted to straddle the bifurcated end of the trigger arm 7, inwardly directed portions 17 intermediate its ends adapted to seat in the sockets 23, a looped reduced end forming a tongue 18 overlying the bait supporting disk 9 and a pair of leg portions 19 terminating in inwardly directed arms 20 designed to take under the end 8 of the arm 7 as shown in Figure 2. The construction of the clamp is such that in the described position on the arm 7 the tongue 18 is urged in the direction of the disk 9 and with its end directly against the bait thereon.

Preferably the clamp is formed of a single piece of resilient piano wire bent upon itself to provide substantially parallel side bars disposed in a common plane and forming the frame 15, the connections of the legs 19 to said frame are disposed in planes substantially at right angles to the plane of said frame and the legs 19 converge forwardly under the tongue 18 and are shorter than said frame.

The foregoing is a detailed description of a preferred embodiment of my invention but it is to be understood that right is herein reserved to changes and modifications falling within the scope of the appended claims.

What I claim is:

1. In a rodent trap, a combined trigger and bait holding arm fulcrumed intermediate its ends and having a bait supporting end, and means for clamping bait to said arm comprising, a pair of laterally spaced lugs on said arm adjacent the fulcrum thereon, the upper ends of said lugs being provided with sockets, and a detachable bait clamp comprising a frame of resilient wire having a wide portion adapted to straddle said lever, inwardly directed portions intermediate the ends of the frame adapted to seat in said sockets, a looped reduced end projecting over the bait supporting end of the arm, and a pair of leg portions terminating in inwardly directed ends adapted to take under said arm and tension said looped end.

2. A bait clamp comprising, a frame formed of a single piece of resilient wire and comprising substantially parallel side bars normally disposed in a common plane, said frame being reduced in width substantially midway of its ends to provide inwardly extending portions and a tongue portion at one end of said frame, and a pair of straight leg portions connected to said side bars, respectively, at the other end of the frame to extend toward said tongue portion in converging relation, the connections between the legs and side bars lying in planes at right angles to the plane of said bars, and said legs being bent at their free ends inwardly to provide right angled straight portions.

3. A bait clamp comprising, a frame formed of a single piece of resilient wire and comprising substantially parallel side bars normally disposed in a common plane, said frame being reduced in width substantially midway of its ends to provide inwardly extending portions and a tongue portion at one end of said frame, and a pair of straight leg portions connected to said side bars, respectively, at the other end of the frame to extend toward said tongue portion in converging relation, the connections between the legs and side bars lying in planes at right angles to the plane of said bars, said legs being bent at their free ends inwardly to provide right angled straight portions, said frame and pair of legs being under tension against separative movement.

4. A trigger arm for rat traps comprising a lever adapted to be fulcrumed intermediate its ends, said lever having a pair of laterally spaced upstanding lugs adjacent its center having sockets formed in their upper edges respectively.

GEORGE G. SPRANG.